United States Patent [19]

Everts

[11] Patent Number: 4,505,040
[45] Date of Patent: Mar. 19, 1985

[54] COUPLING FOR INTERCONNECTING TWO HANDLE PORTIONS OF A POWER DRIVEN IMPLEMENT

[76] Inventor: Robert G. Everts, 7125 W. Galveston, Chandler, Ariz. 85224

[21] Appl. No.: 549,804

[22] Filed: Nov. 9, 1983

Related U.S. Application Data

[63] Continuation-in-part of Ser. No. 413,521, Aug. 31, 1982, Pat. No. 4,463,498.

[51] Int. Cl.³ .............................................. A01D 50/00
[52] U.S. Cl. .................................. 30/296 R; 56/12.7; 172/41; 30/122
[58] Field of Search .................... 172/15, 41; 30/296, 30/240, 276, 122; 56/12.7, 17.1

[56] References Cited

U.S. PATENT DOCUMENTS

| | | | |
|---|---|---|---|
| 2,550,590 | 4/1951 | Parmilleux | 172/41 X |
| 2,553,463 | 5/1951 | McCulloch | 172/41 X |
| 2,888,994 | 6/1959 | Hoff et al. | 172/41 X |
| 3,605,841 | 9/1971 | Lindstrom et al. | 30/276 |
| 4,122,601 | 10/1978 | Katsuya | 30/296 A |
| 4,286,675 | 9/1981 | Tuggle | 30/276 X |
| 4,364,435 | 12/1982 | Tuggle | 172/41 |
| 4,391,041 | 7/1983 | Porter-Bennett | 30/296 R |
| 4,421,176 | 12/1983 | Tuggle et al. | 172/41 |
| 4,451,983 | 6/1984 | Johnson et al. | 30/276 |
| 4,463,498 | 8/1984 | Everts | 30/296 R |

FOREIGN PATENT DOCUMENTS 1578906 11/1980 United Kingdom .

Primary Examiner—Jimmy C. Peters
Attorney, Agent, or Firm—Warren F. B. Lindsley

[57] ABSTRACT

A coupling for the handle shaft of a power driven implement which permits angular adjustment of a drive head. The coupling clamps two parts of the handle shaft together, preventing rotation of one part and permits the selectable rotation of the other. The coupling comprises a split clamp joining and securely holding the handle parts in abutment with one part of the handle shaft telescopically interconnecting with the split clamp, and the other part of the handle shaft rotatably interconnecting with the split clamp in any one of a plurality of alignments. A releasable fastener permits loosening of the split clamp to allow rotational adjustment of the parts and their retention at a selected orientation.

11 Claims, 13 Drawing Figures

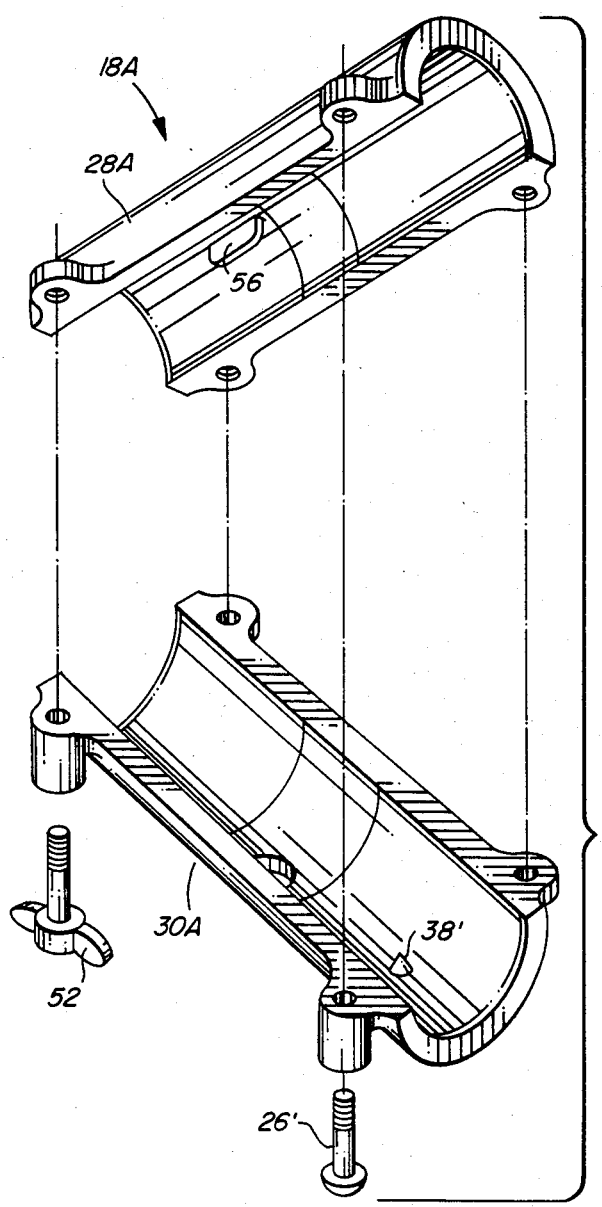
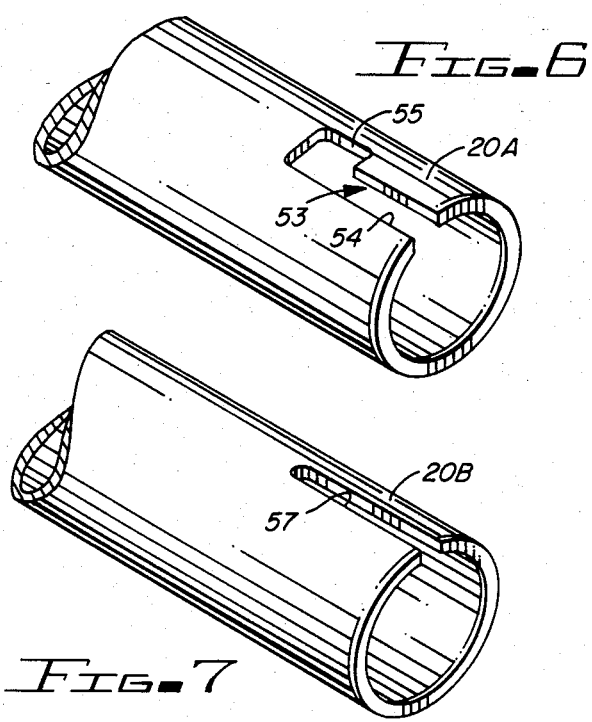
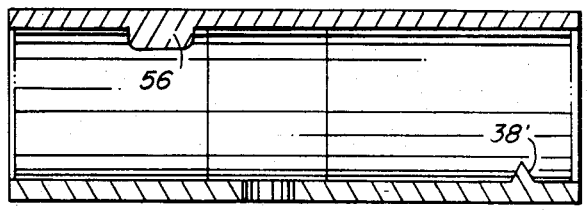
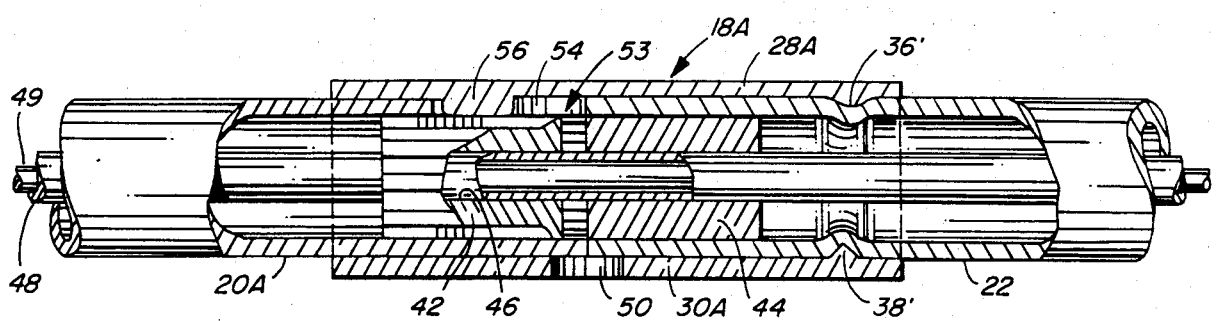

COUPLING FOR INTERCONNECTING TWO HANDLE PORTIONS OF A POWER DRIVEN IMPLEMENT

This application is a continuation in part of U.S. Pat. application, Ser. No. 413,521, filed Aug. 31, 1982 now U.S. Pat. No. 4,463,498 and entitled Coupling for Flailing Line Trimmer Handles.

Field of the Invention

This invention relates to power driven implements such as, for example, trimmers of the flailing line type, air blowers, cultivators, snow blowers, mowers and the like, and more particularly, to a coupling means for easily and quickly joining and separating two separable parts of a handle shaft of an implement at a point which may be substantially midway of its length.

One conventional implement of this type has an engine or motor mounted on the outboard end of a handle shaft and a drive head, implement or tool at the other end of the shaft. A number of reasons exist for manufacturing the handle shaft of the implement in two separable parts, one of which is to reduce the overall length of the implement for shipping purposes. Another reason is to conveniently adjust the position of the actuated tool head of the implement relative to its power driving engine or motor source. A further reason for providing a power driven implement with a handle shaft separable someplace along its length is to be able to use a given engine or motor of one implement with a number of different implement heads or tools such as, for example, with a flailing line trimmer, air blower, snow blower, cultivator, mower and the like.

BACKGROUND OF THE INVENTION

Accordingly, this invention is directed to a handle shaft joint which enables the power driven tool of an implement to be conveniently separate from its power driving end, to be angularly positioned relative thereto in some instances and/or to be replaced by a like or different implement or tool head.

Shipping elongated implements are not only inconvenient to handle, but are more costly to package than smaller structures. Further, a common power driving end of an implement that can be used with a number of implement heads or tools makes the device saleable to a larger number of prospective buyers and for a larger variety of uses without substantially increasing the costs involved.

With regard to weed and grass trimmers using a flailing line for cutting purposes now widely used for many different kinds of trimming purposes, such as around obstacles and edging, the plane occupied by the rotating flail is differently oriented. Sometimes it is adjusted for horizontal trimming and at other times for vertical trimming or at an angle in between these two positions.

One conventional flailing line trimmer comprising an engine or motor mounted on the outboard end of a handle shaft employs a flexible cable that passes through the handle shaft from the motor to the drive head of the flailing line. A grip on the handle shaft permits the operator to maneuver the plane of the rotating cutting line by tilting the drive head at whatever angle is necessary. In other conventional devices, both the motor and the drive head are located at the distal end of the handle shaft.

A difficulty in the use of such trimmers is that the weight of the engine makes maneuvering and tilting at various angles tiring, particularly when the engine and the drive head are at opposite ends of the device. The engine is usually mounted and balanced for use in one position relative to the handle, and a positive torque must be applied to tilt the assembly. Also, when an internal combustion engine is used, it may not operate properly if tilted at excessively steep angles. The tilting can affect the flow of fuel which will disturb engine operation or even cause it to stop. It is advantageous for the internal combustion engine to remain in one suitable orientation when the drive head is tilted at various angles relative to the engine to tilt the cutting line. This also reduces operator fatigue. When the motor is carried on the head (then it is usually an electric motor), it is still useful to be able to change the head orientation relative to the handle so the user can have the most effort-free grip on the assembly.

DESCRIPTION OF THE PRIOR ART

British Pat. No. 1,578,906 discloses an apparatus for cutting vegetation which employs a coupling means comprising a first tubular member telescopically inserted in a second tubular member whereby rotational alignment of the first member may be fixed in relation to the second member in any of a plurality of alignments. This coupling means may be disengageable upon telescopic movement of the first member with respect to the second member. Resilient means biased against the telescopic movement are used for maintaining interengagement of the members in any one of a plurality of alignments.

BRIEF DESCRIPTION OF THE INVENTION

In accordance with the invention claimed, an implement head or tool is mountable on a hollow shaft by means of a new and improved coupling which detachably joins two parts of the shaft together. One of the parts comprises a handle having a grip and might also carry an engine thereon while the other part supports a drive head for accomplishing many different functions such as, for example, spinning a cutting line on a flailing line trimmer and, in some devices, also supporting a motor to turn the drive head. A coupling joins and secures the two parts of the device together and allows in some instances one part to be rotatably adjusted relative to the other part.

The coupling comprises a split clamp fitting around and securely clamping the abutting ends of the two parts of the handle shaft of the implement. In one embodiment, one part of the handle shaft has a circumferential groove which is engaged by a lip on the inside surface of one of the clamp halves. The clamp can be loosened to allow for rotation without axial removal. The other part of the handle shaft has a recess or a hole engaged by a pin on one of the clamp halves that prevents any rotation. The lip and the pin prevent separation of their respective part. In another embodiment, the end of the other part of the handle shaft has a slotted configuration for telescopically engaging with one end of the clamp. In a further embodiment, the clamp or coupling connects two parts of the handle shaft including an inner drive system for the drive head.

A sight port optionally can be provided in the coupling so that the user can be certain that the clamp is properly located.

Therefore, it is one object of this invention to provide a new and improved coupling for an implement employing a handle shaft which can be readily separated into two parts so that different power driven tools may be interchangably added for actuation by a common power driving source.

Another object of this invention is to provide a new and improved coupling for an elongated implement the handle shaft of which may be separated and readily reassembled so that the overall length of the device may be reduced for packaging and shipping purposes.

A further object of this invention is to provide a new and improved implement employing a coupling which permits a drive head to be tiltably adjustable relative to an engine or motor on the handle end thereof.

A still further object of this invention is to provide an implement having a two-part handle shaft, with one part being rotatable relative to the other, and the other part fixed relative to a handle of the implement.

A still further object of this invention is to provide a handle joint or coupling that enables the cutting angle of a flailing line trimmer to be conveniently adjusted by telescopically interconnecting with the implement and rotatably interconnecting with the handle of the implement in any one of a plurality of alignments.

A still further object of this invention is to interconnect two parts of a handle shaft of an implement employing a split flexible drive cable extending therethrough interchangably to different power heads such as a trimmer, air blower, cultivator, snow blower, mower and the like.

Further objects and advantages of this invention will become apparent as the following description proceeds and the features of novelty will be pointed out in the claims annexed to and forming a part of this specification.

BRIEF DESCRIPTION OF THE DRAWINGS

The present invention may be more readily described by reference to the accompanying drawings, in which:

FIG. 6 is a partially perspective view of a modification of the lower end of the handle shaft portion shown in FIGS. 1-5;

FIG. 7 is a partially perspective view of a further modification of the lower end of the handle shaft portion shown in FIGS. 1-6;

FIG. 8 is an exploded perspective view of a modification of the coupling shown in FIGS. 1-5 for use with the handle shaft portions shown in FIGS. 6 and 7;

FIG. 9 is a cross-sectional view of the coupling shown in FIG. 8 when assembled;

FIG. 10 is a broken away view partially in cross-section of the coupling shown in FIG. 8 in assembly with the handle shaft portions;

DETAILED DESCRIPTION OF THE INVENTION

Figure 1:
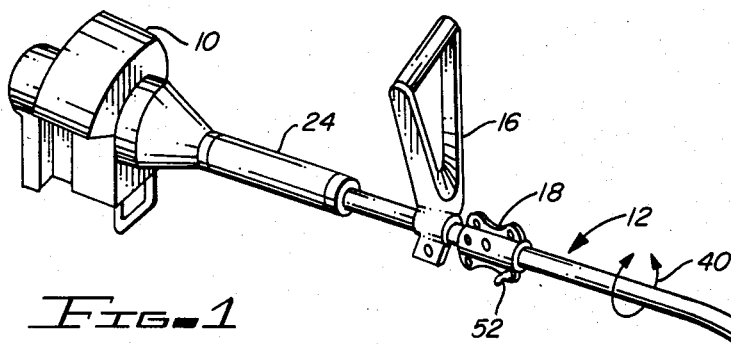
Fig. 1 is a perspective view of a trimmer having a tiltably adjustable drive head according to the invention.
Figure 2:
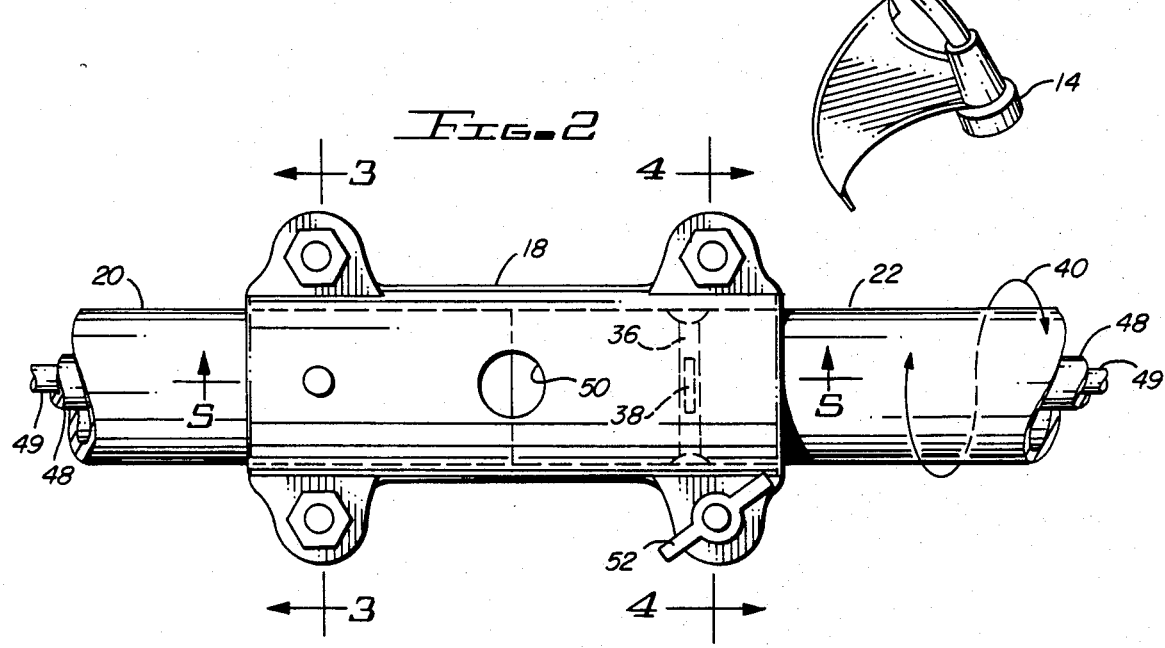
Fig. 2 is an enlarged partial section of FIG. 1 showing the novel coupling.
Figure 3:
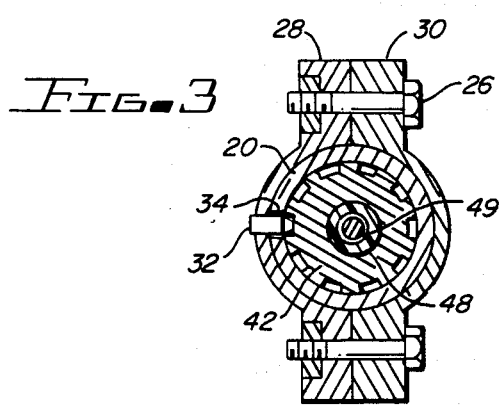
Fig. 3 is a sectional view taken at line 3—3 in FIG. 2.
Figure 4:
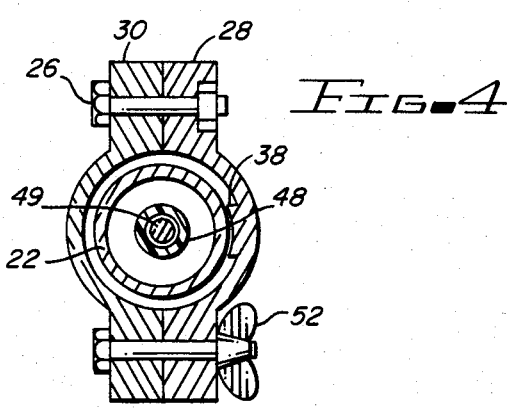
Fig. 4 is a sectional view taken at line 4—4 in FIG. 2.
Figure 5:
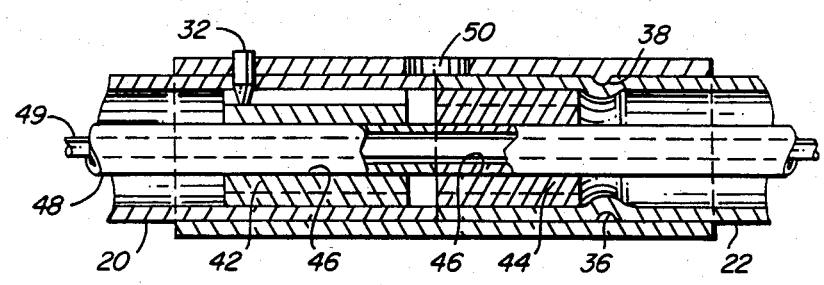
FIG. 5 is a sectional view taken at line 5—5 in FIG. 2.

In accordance with the invention claimed a flailing line trimmer is shown in FIG. 1 which flails a line in a circular path to trim grass and weeds. As illustrated in FIG. 1 the device comprises an engine 10 mounted on the proximal end of a hollow handle shaft 12 through which a flexible power transmitting cable 49 (as shown in FIG. 2) passes therethrough to drive head 14. Handle 16 permits maneuvering of the drive head and flailing line structures.

The present invention permits easy adjustment of the angle of the drive head for trimming around variously oriented obstructions. This is accomplished by providing a hollow handle shaft in two parts, with one part being rotatable relative to the other part, as shown in FIGS. 2 through 5. These parts are joined and secured by a releasable coupling 18 hereinafter described.

The hollow handle shaft 12 comprises a first handle shaft part 20 and a second handle shaft part 22 with handle shaft part 20 being joined to a hand grip 24 (as shown in FIG. 1) extending outwardly from the engine. Handle shaft part 22 is joined to drive head 14 at one end and is rotatably joined and secured in abutment with handle shaft part 20 by a releasable coupling 18.

Coupling 18 comprises a split clamp secured around the abutting ends of the two handle shaft parts by means of fasteners passing through mating flanges 28 and 30 on each end and opposite sides of the split clamp. Pin 32 mates with recess 34 in the end of handle shaft part 20 to prevent rotation of handle shaft part 20 relative to the clamp, and therefore relative to handle shaft part 22. It also prevents axial separation of handle shaft part 20 from the clamp when the clamp is tightened.

Handle shaft part 22 has a circumferential groove 36 near its abutting end. A lip 38 on the inside surface of coupling 18 engages in circumferential groove 36. Lip 38 allows handle shaft part 22 to rotate relative to the clamp, and therefore relative to handle shaft part 20, as shown by arrow 40, but prevents separation of handle shaft part 20 from coupling 18. Handle shaft part 20 can be the "upper" part, and handle shaft part 22 the "lower" part of the coupling or vice versa.

Solid cylindrical inerts 42, 44 snugly fit in the hollow ends of the handle shaft parts inside coupling 18 to reinforce the shaft and resist compressive deformation when the clamp is tightened. Holes 46 through inserts 42, 44 permit passage of a cable guide tube 48 which may be formed of Nylon which journals a cable 49 that extends from engine 10 to drive head 14. Cable 49 is kept in central alignment by tube 48. Tube 48 is not needed in the types of weed trimmers where the motor is at the distal end, and there is no cable to support and center. However, the insert will be provided so the clamp cannot crush the parts.

In use, handle shaft part 22 is fitted in the coupling until it abuts the end of handle shaft part 20, as viewed through port or hole 50 provided in the coupling. This also aligns lip 38 with groove 36 in handle shaft part 22. Pin 32 will be fitted into recess 34 in handle shaft part 20 before inserting handle shaft part 22. Their correct abutment can be assured by looking through the hole.

The fasteners are then tightened down securely joining and clamping the two handle shaft parts together.

Conveniently, the fasteners are bolt/nut combinations, with at least one of them adjacent to the groove being a wing nut 52 so it can be readily loosened and tightened. The wing nut will be tightened to fix the position of the drive head. Angular adjustment eliminates the difficult and tiring task of tilting and holding the drive head in opposition to a torque exerted by the cutting head or by the drive head.

FIG. 6 discloses a modification of the lower end of handle shaft part 20 shown in FIGS. 1-5 and comprises a handle shaft part 20A which is provided with a slotted end 53 formed in a bayonet configuration, i.e., has a straight portion 54 and a laterally extending portion 55. This slot is engaged by a ridge 56 mounted to extend inwardly of the inside periphery of coupling 18A and longitudinally thereof, as shown in FIGS. 8-10 when handle shaft part 20A is telescopically inserted into the left end of coupling 18A. Rotating handle shaft part 20A or the coupling a predetermined amount then moves ridge 56 into the laterally closed end portion 55 of slot 53 to interlock handle shaft part 20A and coupling 18A together. The other end of coupling 18A and its association with handle shaft part 22 is identical with the structure and operation of the parts and assembly shown in FIGS. 1-5 except that lip 38 is replaced with a pointed configuration 38' which fits within groove 36'.

FIG. 7 illustrates a further modification of the first part of the handle assembly shown in FIGS. 1-6 wherein the handle shaft part 20B comprises a slot 57 extending inwardly from the end of handle shaft part 20B longitudinally thereof. Ridge 56 of coupling 18A fits into slot 57 and is held in the slot by coupling 18A when wing nut 52 and bolts 26' are tightened.

It should be noted that the implement head of the trimmer shown in FIGS. 1-10, namely the flailing line structure, may be replaced with a cultivator blade head, an air or snow blower implement or a small mower (not shown) and still fall within the scope of the claimed invention.

Figure 11:
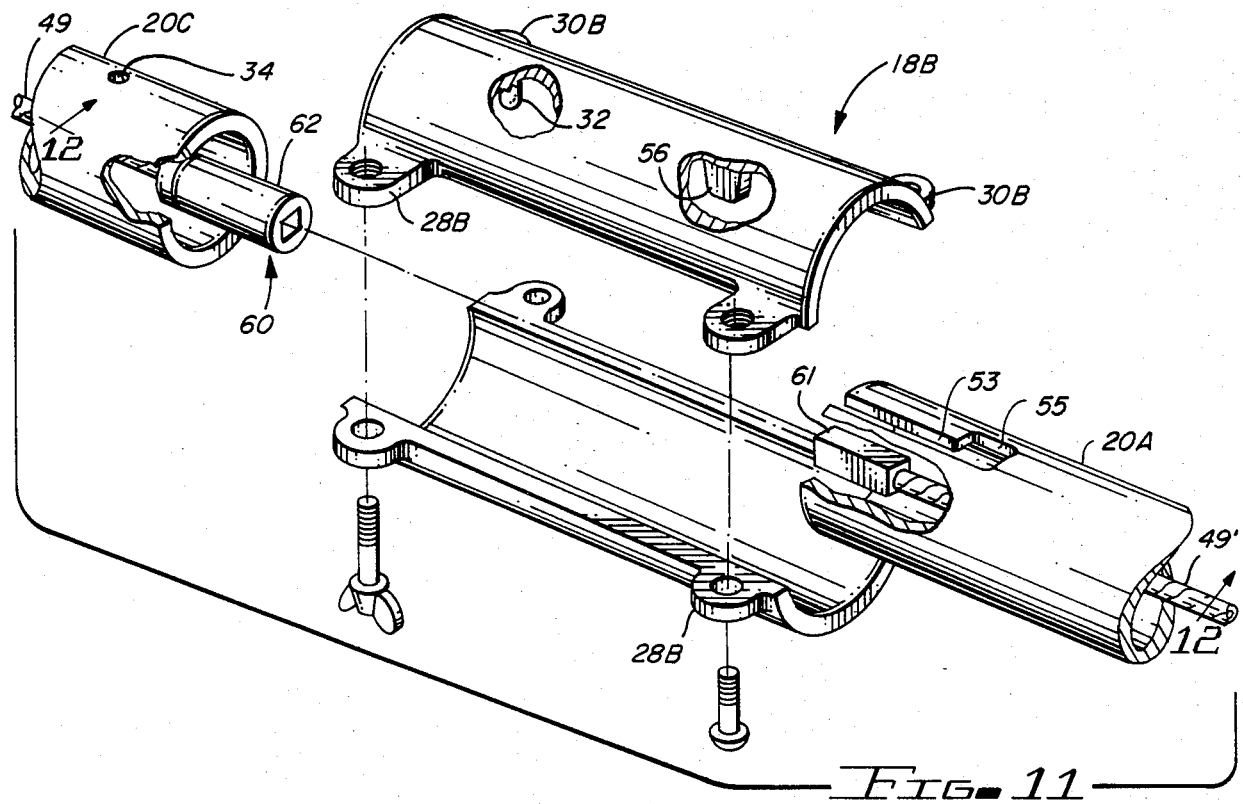
FIG. 11 is an exploded view of a further modification of the couplings shown in FIGS. 1-5 and 8-10 showing a split and selectively interconnectable flexible cable configuration.
Figure 12:
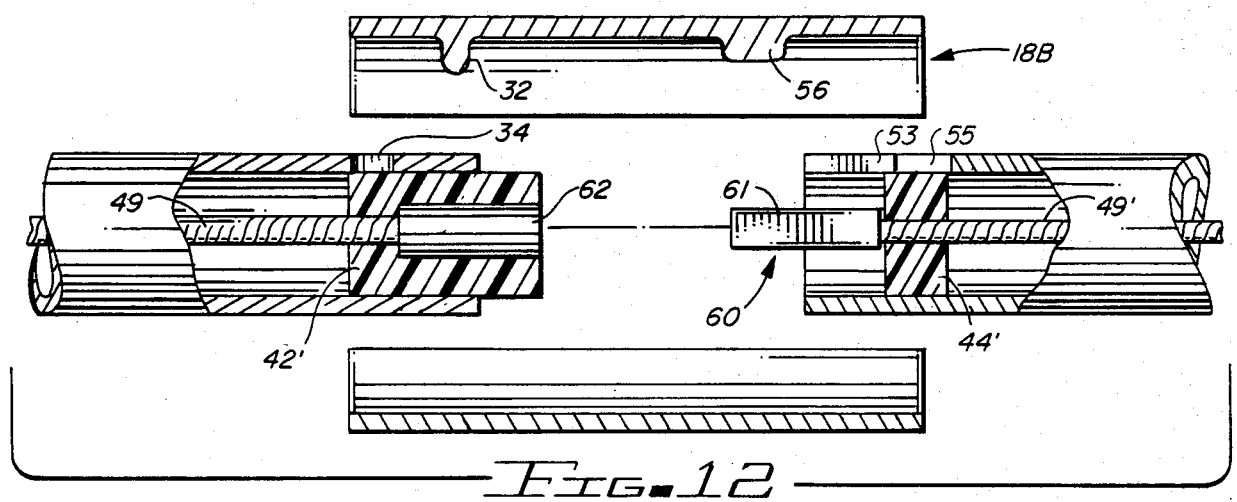
FIG. 12 is a cross-sectional view of the structure shown in FIG. 11.
Figure 13:
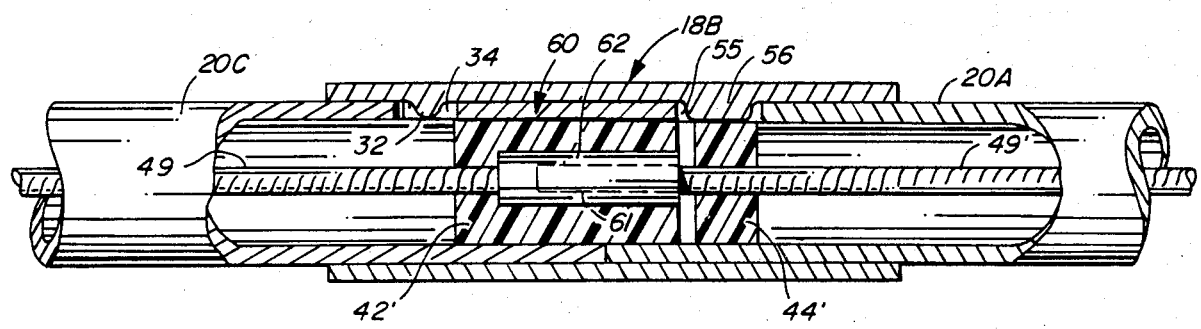
FIG. 13 is a cross-sectional view of the structure shown in FIGS. 11 and 12 when assembled.

FIGS. 11-13 disclose a further modification of the coupling for trimmer, cultivator, blower and mower implements shown in FIGS. 1-10 wherein like parts are given the same reference characters or the number with a "prime" designation if the part has been slightly modified such as inserts 42', 44', guide tube 48' and cable 49' and wherein handle shaft part 20, shown in FIGS. 1-5, is secured in abutment with handle shaft part 20A by a releasable coupling 18B.

Coupling 18B includes a split clamp secured around the abutting ends of the two handle shaft parts by means of fasteners passing through mating flanges 28B and 30B on each side and opposite sides of the split clamp in the manner shown and described for FIGS. 1-5.

Pin 32 mates with recess 34 in the end of handle shaft part 20C to prevent rotation of handle shaft part 20C relative to the clamp and therefore relative to handle shaft part 20A.

Handle shaft part 20A engages a ridge 56 mounted to extend inwardly of the inside periphery of coupling 18B and longitudinally thereof, as shown in FIGS. 11-13, when handle shaft part 20A is telescopically inserted into the right end of coupling 18B. Rotating the handle shaft part 20C or the coupling a predetermined amount moves ridge 56 into the laterally closed end portion 55 of slot 53 to interlock handle shaft part 20A and coupling 18B together.

In order to completely separate the two handle shaft parts of the trimmer for shipment and storage purposes, flexible cable 49 is split or cut at a point within the coupling 18B and connectable when the coupling is assembled on the two parts of the handle shaft.

As noted from FIGS. 11-13, cable 49 comprises a connector 60, one part of which comprises a male end 61 which telescopically fits into a female end 62 of the other engageable part of cable 49 for engagement and disengagement purposes. Although a bayonet type connector is shown for purposes of illustration, any suitable make and break telescopic connection may be used for the flexible cable and still fall within the scope of this invention.

Thus, when the two parts of the handle shaft of the implement are engaging each other, the ends of cable 49 will telescopically engage each other.

It should be noted that a sight hole 50 may be provided in coupling 18B to note the abutment of handle shaft parts 20C and 20A, if so desired.

Thus, there has been described a releasable coupling device for a trimmer of the flailing line type, cultivator, air, snow blower and mower implements or any other power head which permits easy adjustment of the drive head tilt angle.

This invention is not to be limited by the embodiments shown in the drawings and described in the description, which are given by way of example and not of limitation, but only in accordance with the scope of the appended claims.

What is claimed is:

1. A handle held elongated power driven implement having a handle shaft formed by first and second separable and engagable handle shaft parts, a drive head mounted at the distal end of said first handle shaft part, an engine mounted at the distal end of said second handle shaft part, and means for operatively joining said engine to said drive head, the improvement comprising:
   a releasable coupling means for joining the other ends of said first and second handle shaft parts together;
   said releasable coupling means being constructed so that the other end of one of the handle shaft parts is positionable independently of and interlocking with the other end of the other of said handle shaft parts and comprising a split clamp surrounding and securely clamping the other ends of the juxtapositioned handle shaft parts in abutment with each other;
   said coupling means being provided with a stop means on its internal periphery;
   one of the other ends of the handle shaft parts being provided with a slot extending longitudinally inwardly thereof for telescopically engaging with said stop means when engaging with the other end of the other handle shaft part within said coupling means; and
   fastening means for releasably clamping said split clamp around the abuting ends of said first and second handle shaft parts.

2. The implement set forth in claim 1 wherein:
said releasable clamp means may be constructed to allow one of said handle shaft parts to be rotated and held at a predetermined tilt angle with respect to other of said handle shaft parts.

3. The implement set forth in claim 2 wherein:
said stop means comprises a ridge extending longitudinally of said coupling means.

4. The implement set forth in claim 3 wherein:

said slot is provided with an end portion extending laterally thereof for receiving said ridge when said first and second handle shaft parts are abutting.

5. The implement set forth in claim 1 wherein:

said one of said handle shaft parts is provided with a circumferential groove; and said split clamp is provided with a lip on its inside surface in engagement with said groove whereby said handle shaft part may rotate within said clamp and be restrained against axial removal.

6. The implement set forth in claim 1 wherein:

said fastener means comprises a wing nut adapted to be loosened and tightened against said clamp means and thereby against the handle shaft part which has said circumferential groove.

7. The implement set forth in claim 1 wherein:

said coupling means includes a port for viewing the location of the abutting ends of said first and second handle shaft parts in said coupling means.

8. The implement set forth in claim 1 wherein:

said engine is mounted on the outboard end of said implement; and said means operatively joins said engine to said drive head comprising a cable passing through said first and second handle shaft parts.

9. The implement set forth in claim 1 in further combination with:

a cable extending longitudinally through said handle shaft parts for interconnecting said engine with said drive head;

said cable being cut at a point within said coupling means to form two interconnectable ends; and connector means attached to said ends for engagement when said fastening means clamps said first and second handle shaft parts together.

10. The implement set forth in claim 9 wherein:

said connector means engage in a telescopic manner.

11. The implement set forth in claim 1 wherein:

said drive head comprises a trimmer of the flailing line type.

* * * * *